United States Patent [19]

Dao et al.

[11] Patent Number: 5,049,862
[45] Date of Patent: Sep. 17, 1991

[54] KEYLESS FLAT PANEL PORTABLE COMPUTER—COMPUTER AIDED NOTEBOOK

[75] Inventors: James Dao, Hillsborough; David C. Foyt, Belmont; Jeffrey J. Dao, Hillsborough; Kenneth R. Allen, Palo Alto, all of Calif.

[73] Assignee: Communication Intelligence Corporation ("CIC"), Menlo Park, Calif.

[21] Appl. No.: 418,009

[22] Filed: Oct. 6, 1989

[51] Int. Cl.$^5$ .............................................. G09G 3/02
[52] U.S. Cl. ...................................... 340/706; 178/18
[58] Field of Search ...................... 340/706; 178/18; 382/13, 59, 3

[56] References Cited

U.S. PATENT DOCUMENTS

| | | | |
|---|---|---|---|
| 4,058,849 | 11/1977 | Fitzgerald et al. | 364/520 |
| 4,517,660 | 5/1985 | Fushimoto et al. | 364/708 |
| 4,571,456 | 2/1986 | Paulsen et al. | 179/2 |
| 4,730,186 | 3/1988 | Koga et al. | 178/18 |
| 4,752,965 | 6/1988 | Dunkley et al. | 382/3 |

FOREIGN PATENT DOCUMENTS 0254561  1/1988  European Pat. Off. .

OTHER PUBLICATIONS

Brochure of Linus Technologies, Inc. for Write-Top Specifications, undated.
Canon AI Note(book), Manual for IN-3000, 1988 (cover, pp. 1, 12, 13 & cover), in the Japanese language.
McCormick, John, "An Intelligent Clipboard", *ID Systems* (Sep. 1988), pp. 25-29.
Waters, Tom, "Back to Basics", *Discover* (Dec. 1988), pp. 26-27.
Brochure of Takenaka of Japan for T-board, undated, in the Japanese language.

*Primary Examiner*—Alvin E. Oberley
*Assistant Examiner*—Xiao Min Wu
*Attorney, Agent, or Firm*—Townsend and Townsend

[57] ABSTRACT

A keyboardless portable computer simulates a foldable notepad and has a display which can be reoriented to the convenience of the user, carried in a self-protecting closed position and operated in any convenient open position. The computer has a first flat panel, a second flat panel and hinge means for joining the first panel to the second panel such that the first flat surface is juxtaposed to the second flat surface in a closed position and is disposed side by side in a common plane in one of a selection of open positions. The first flat surface comprises a first digitizer and the second flat surface comprises a second digitizer, and a stylus is provided which is connectable to at least one of the panels for interacting with at least one of the digitizers. One of the digitizers includes a flat panel display through which visual output is provided. Thus, registration of a written symbol on the surface of the panel produces a displayed symbol, preferably at the position of registration. The panels may be detachable at the hinge means, folded back to back to one another for compact usage and a second hinge on a digitizer panel permits a bound paper notebook to be interleaved with a thin digitizer.

19 Claims, 13 Drawing Sheets

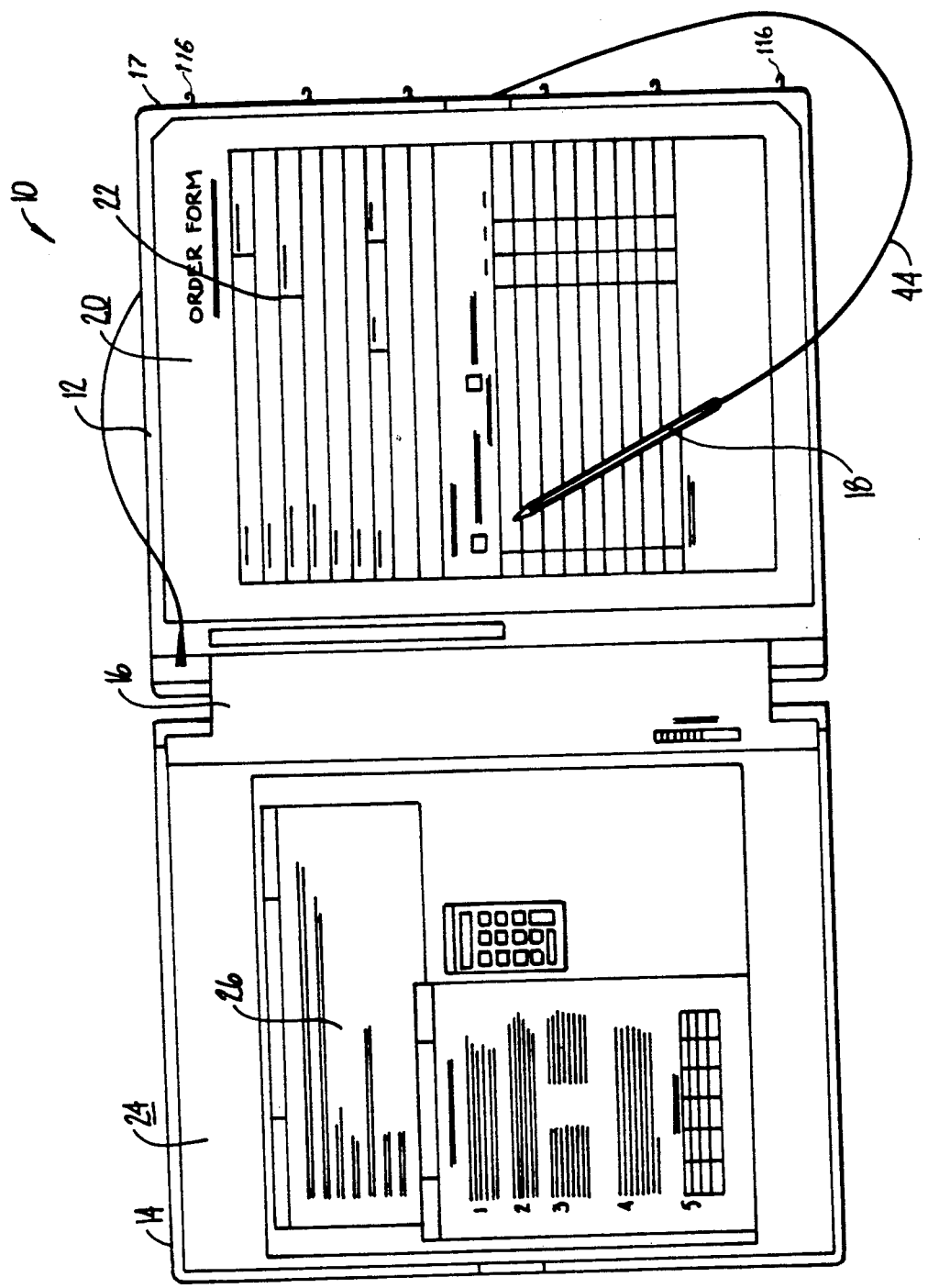
FIG._1.

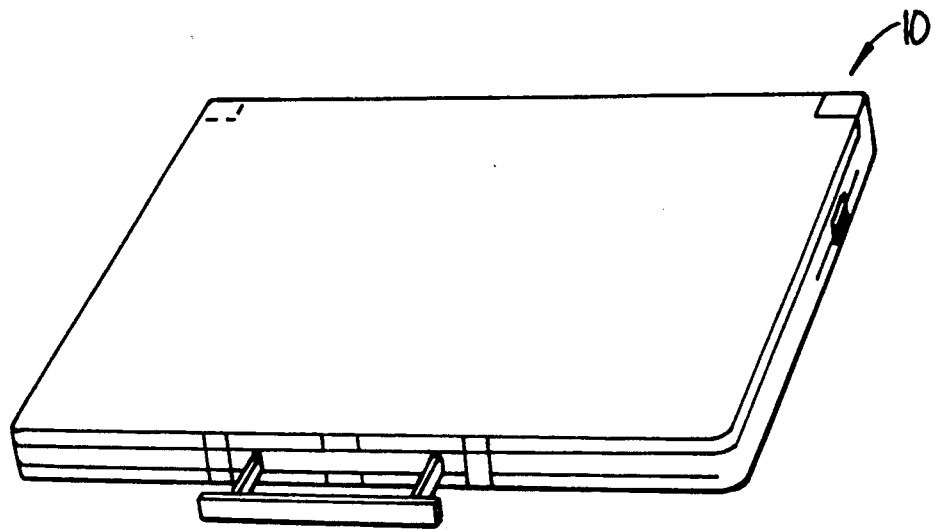
FIG._2.
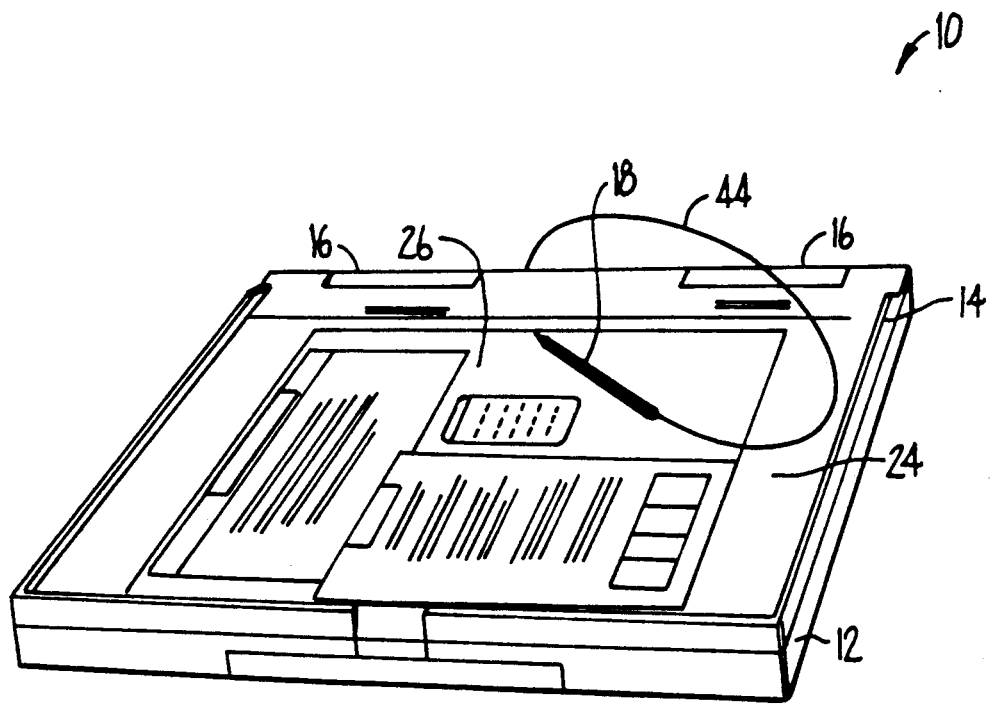
FIG._3.

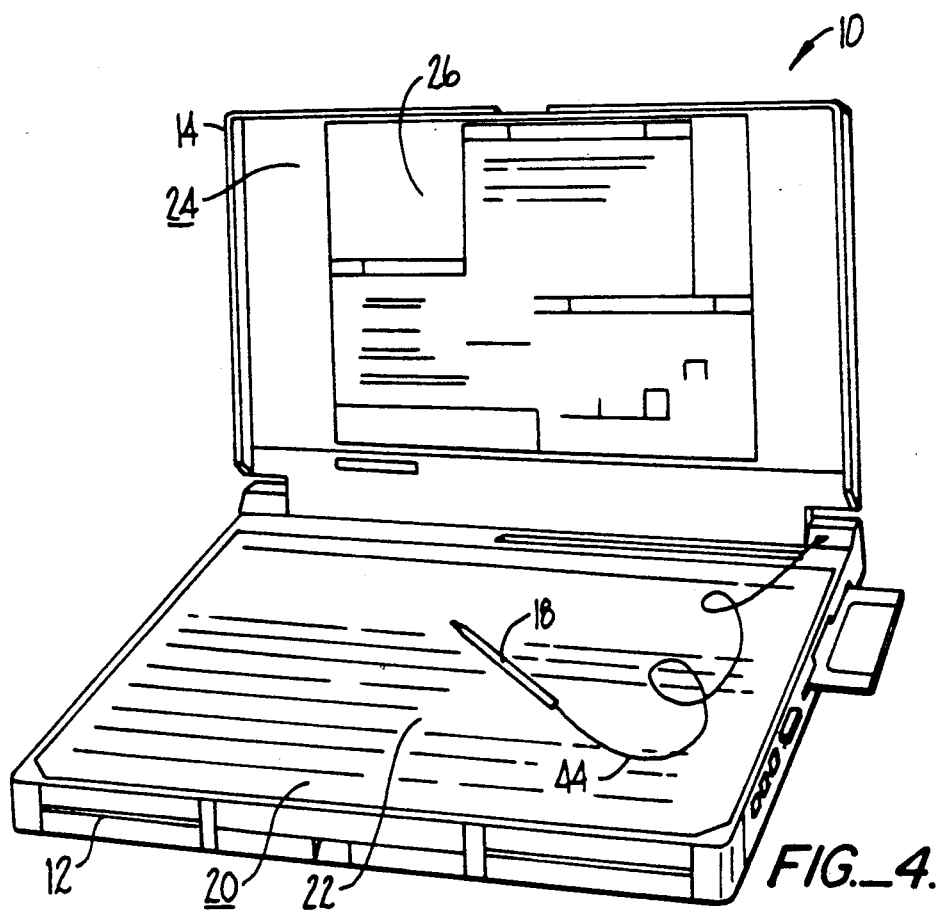
FIG._4.
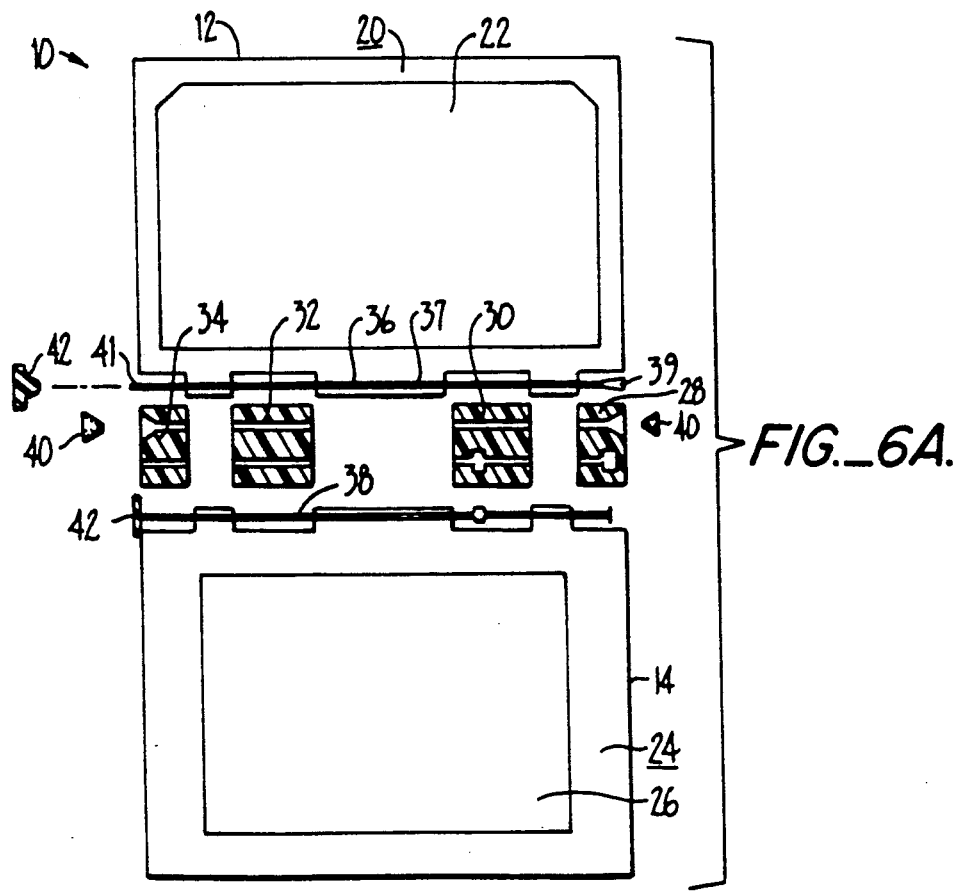
FIG._6A.

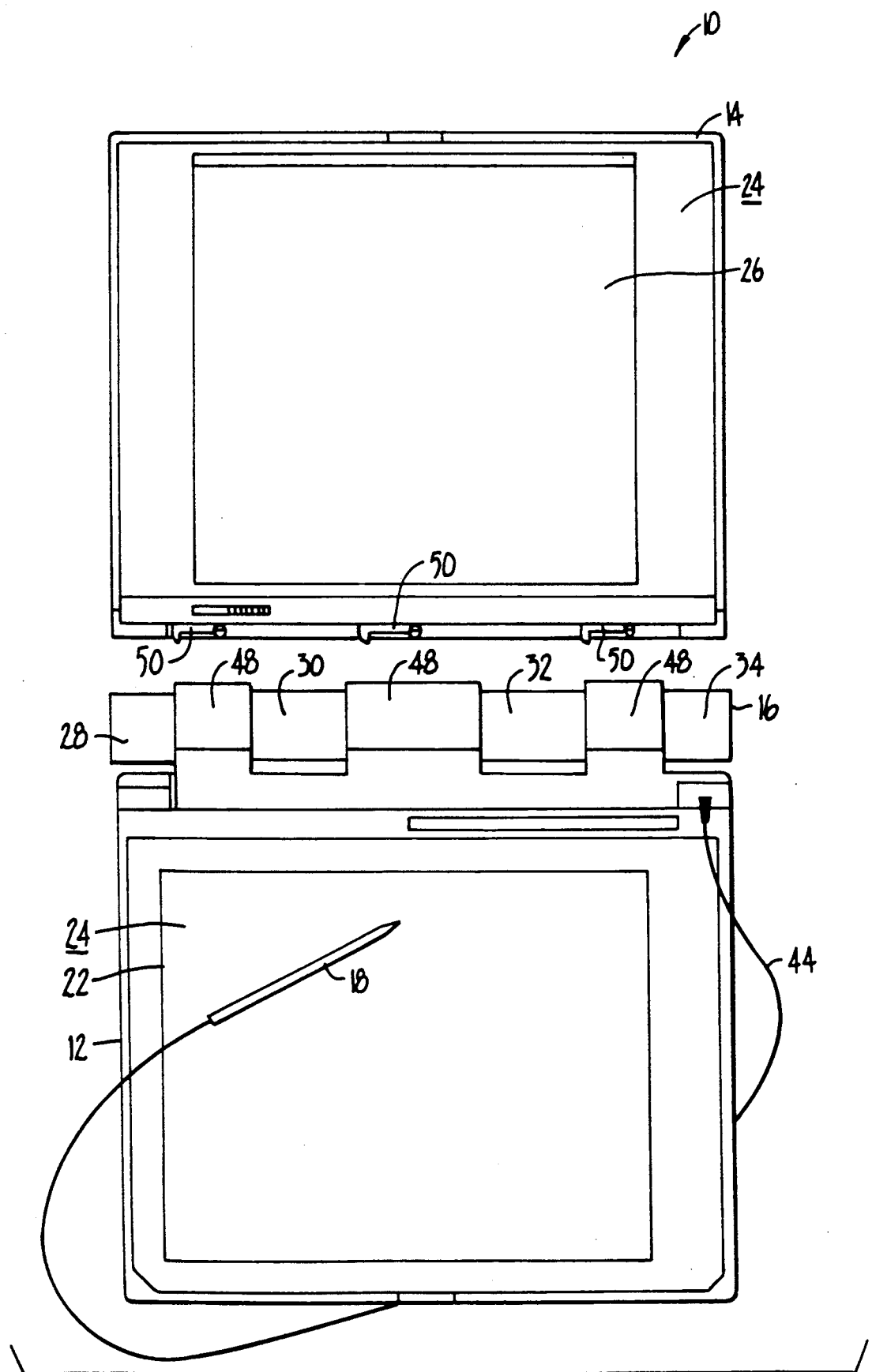
FIG._5.

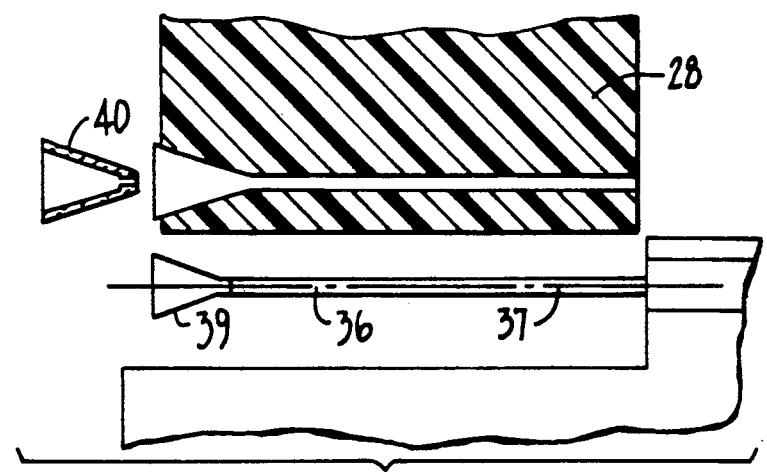
FIG._6B.
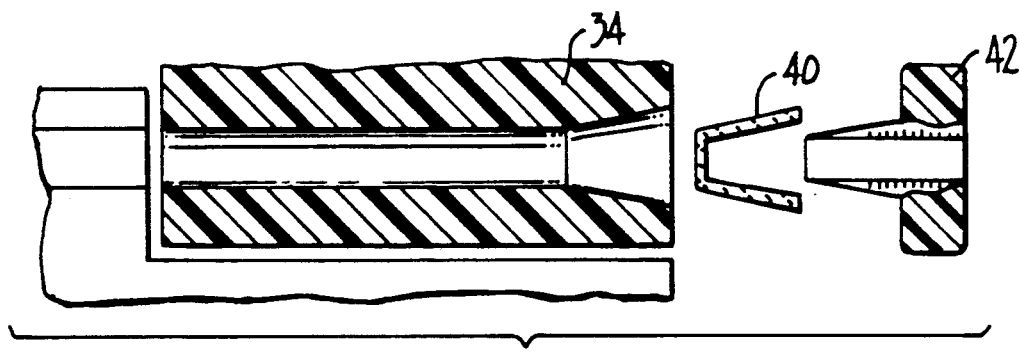
FIG._6C.
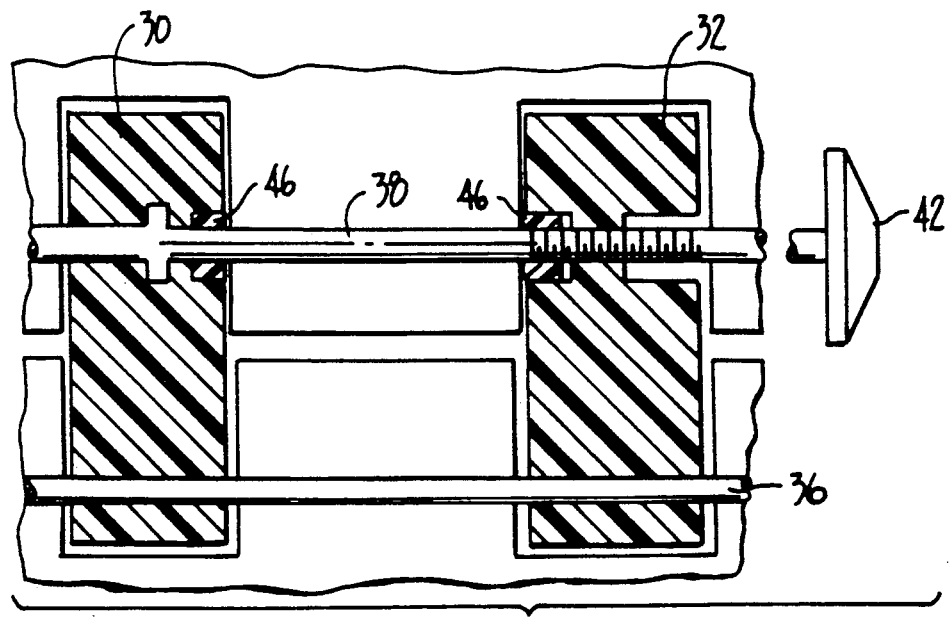
FIG._6D.

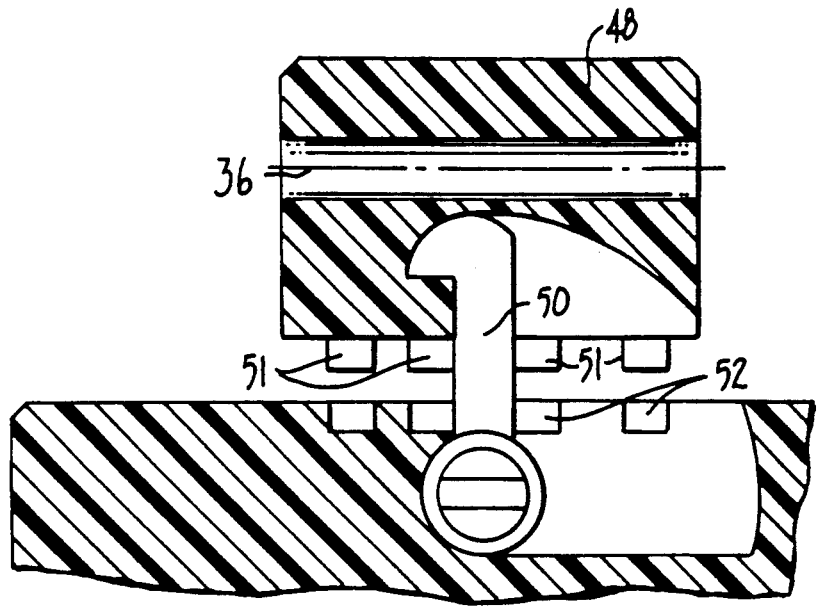
FIG._6E.
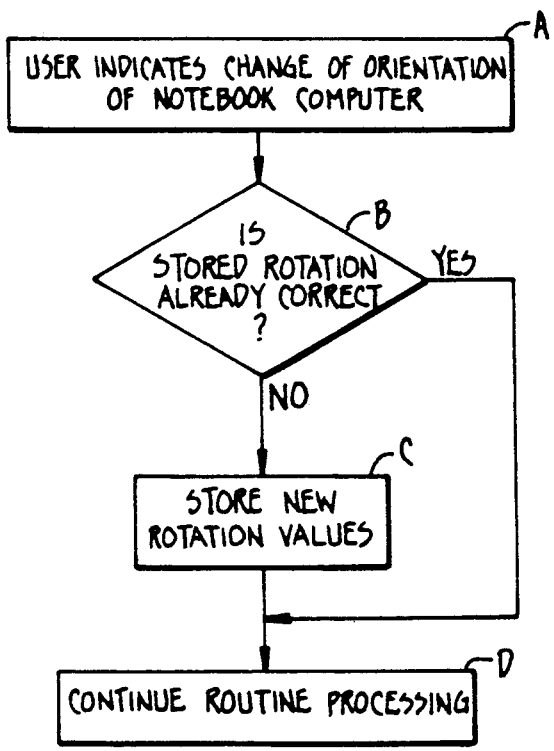
FIG._7A.

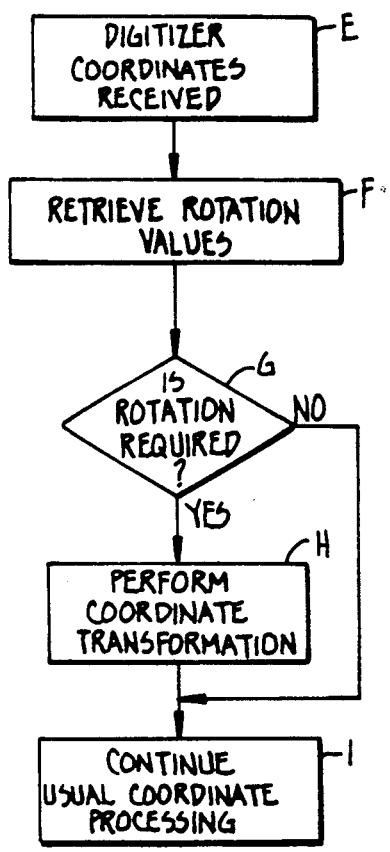
FIG._7B.
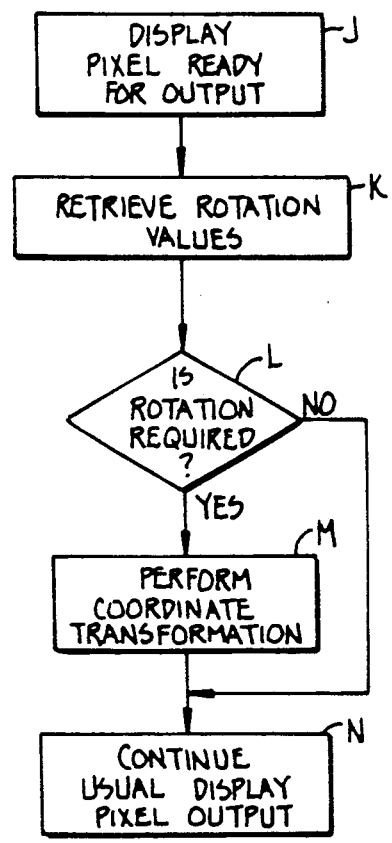
FIG._7C.

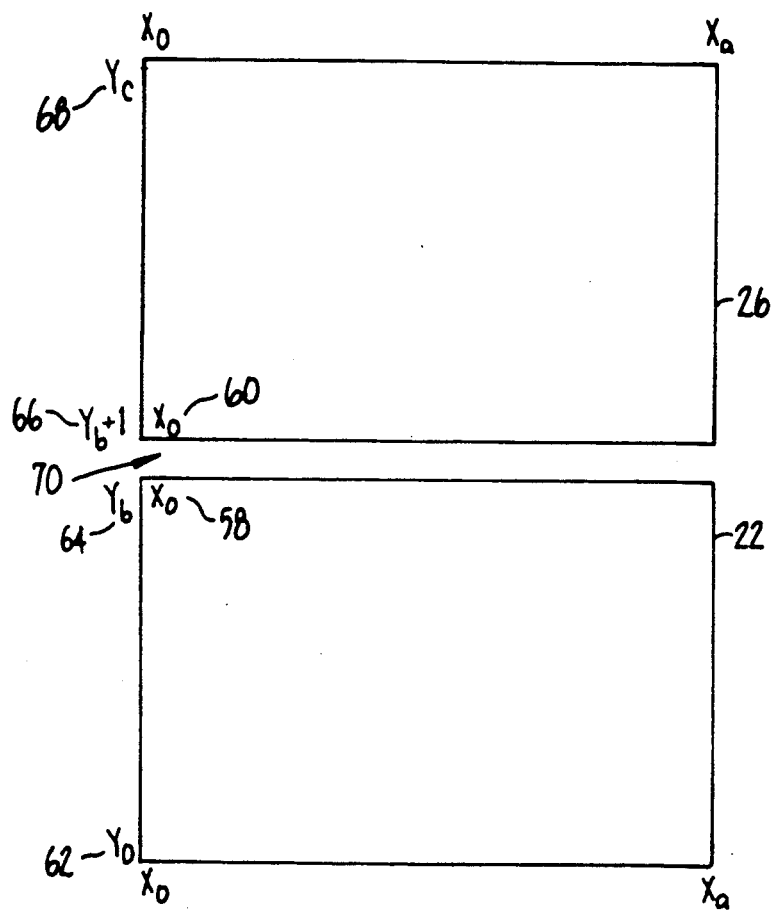
FIG._7D.
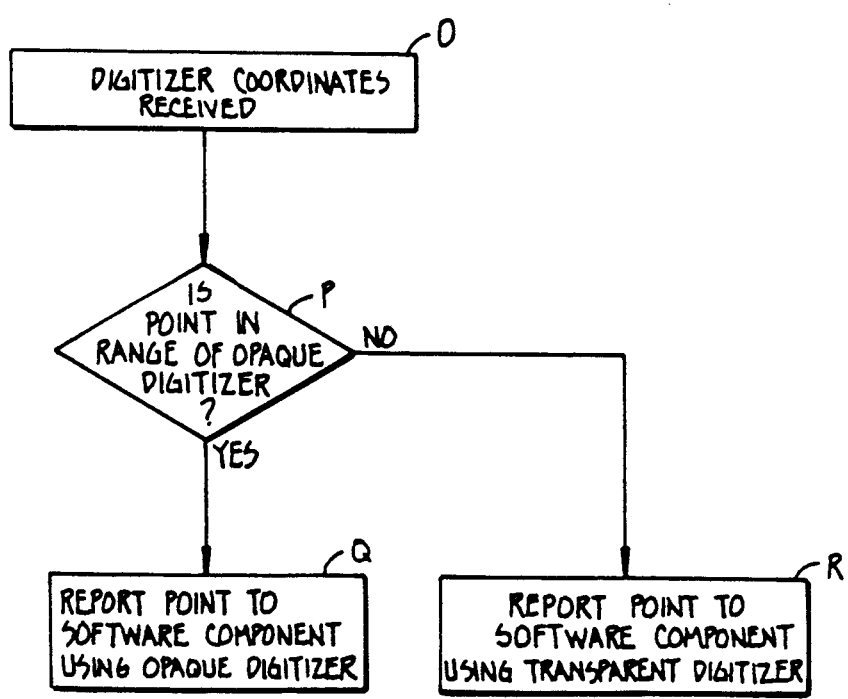
FIG._7E.

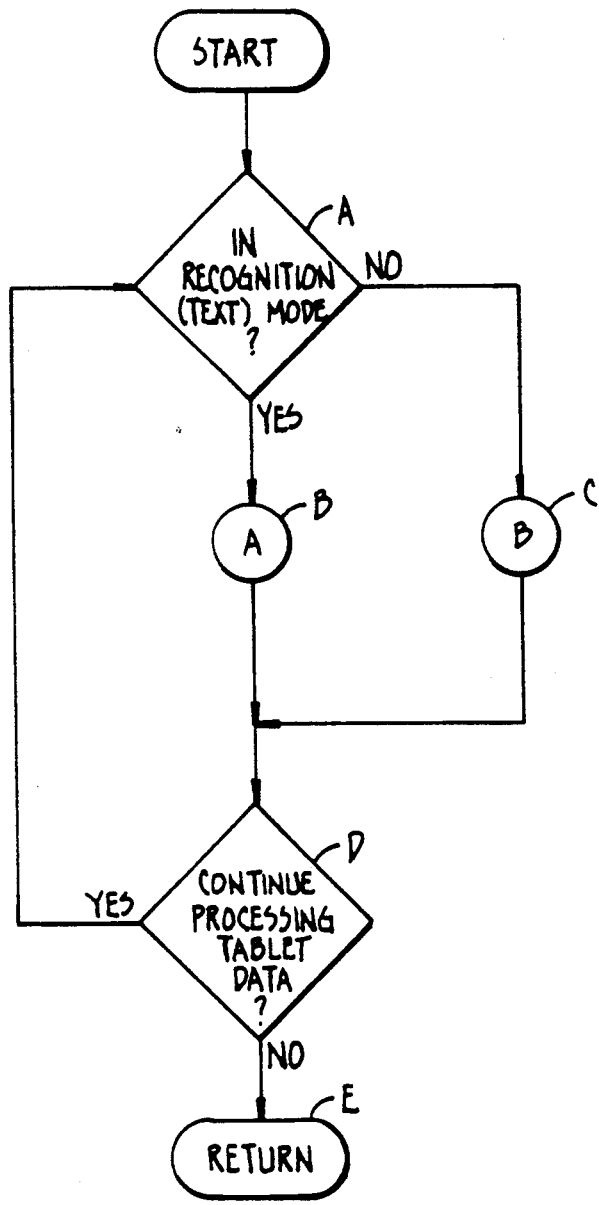
FIG._8A.

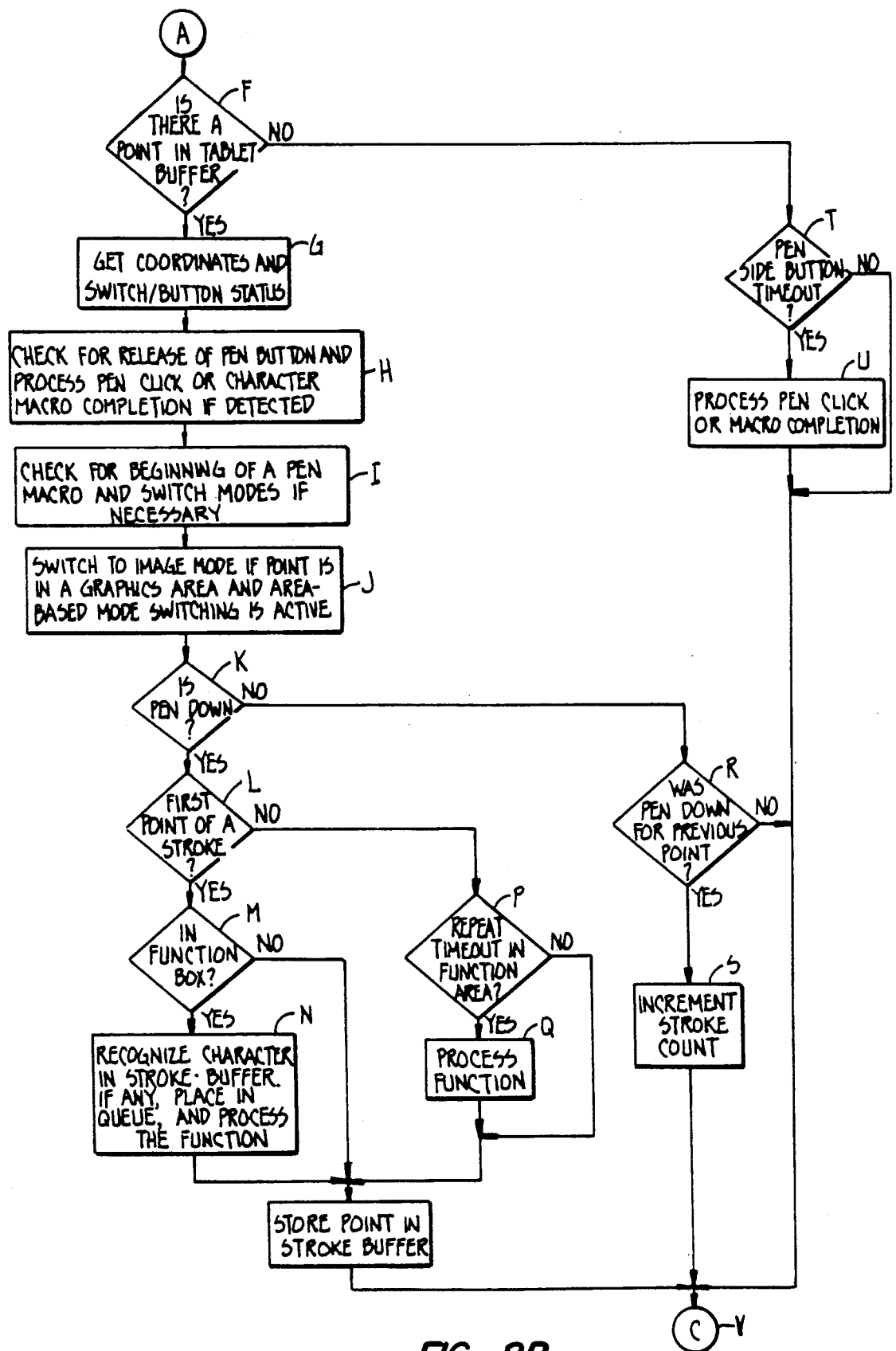
FIG._8B.

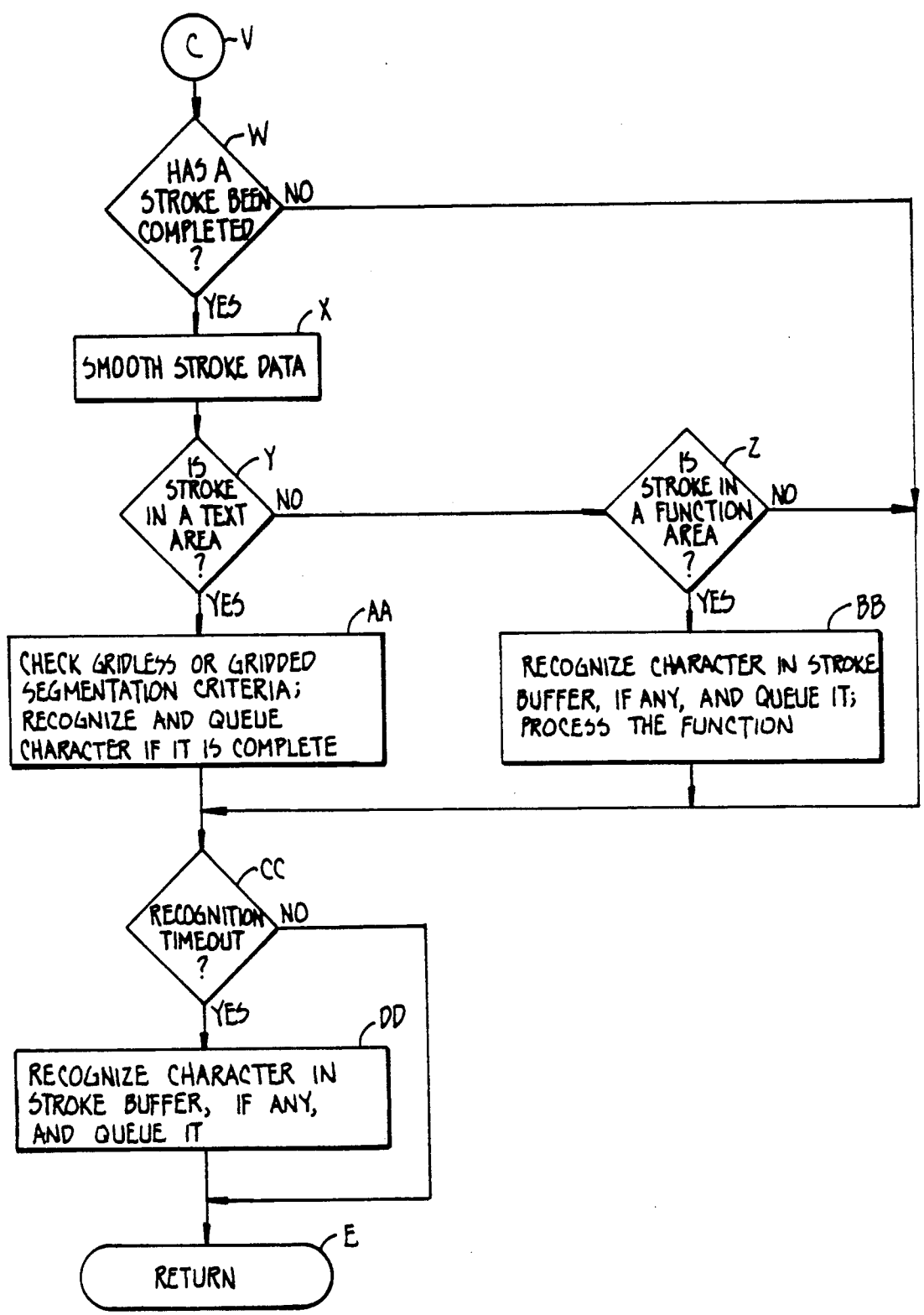
FIG._8C.

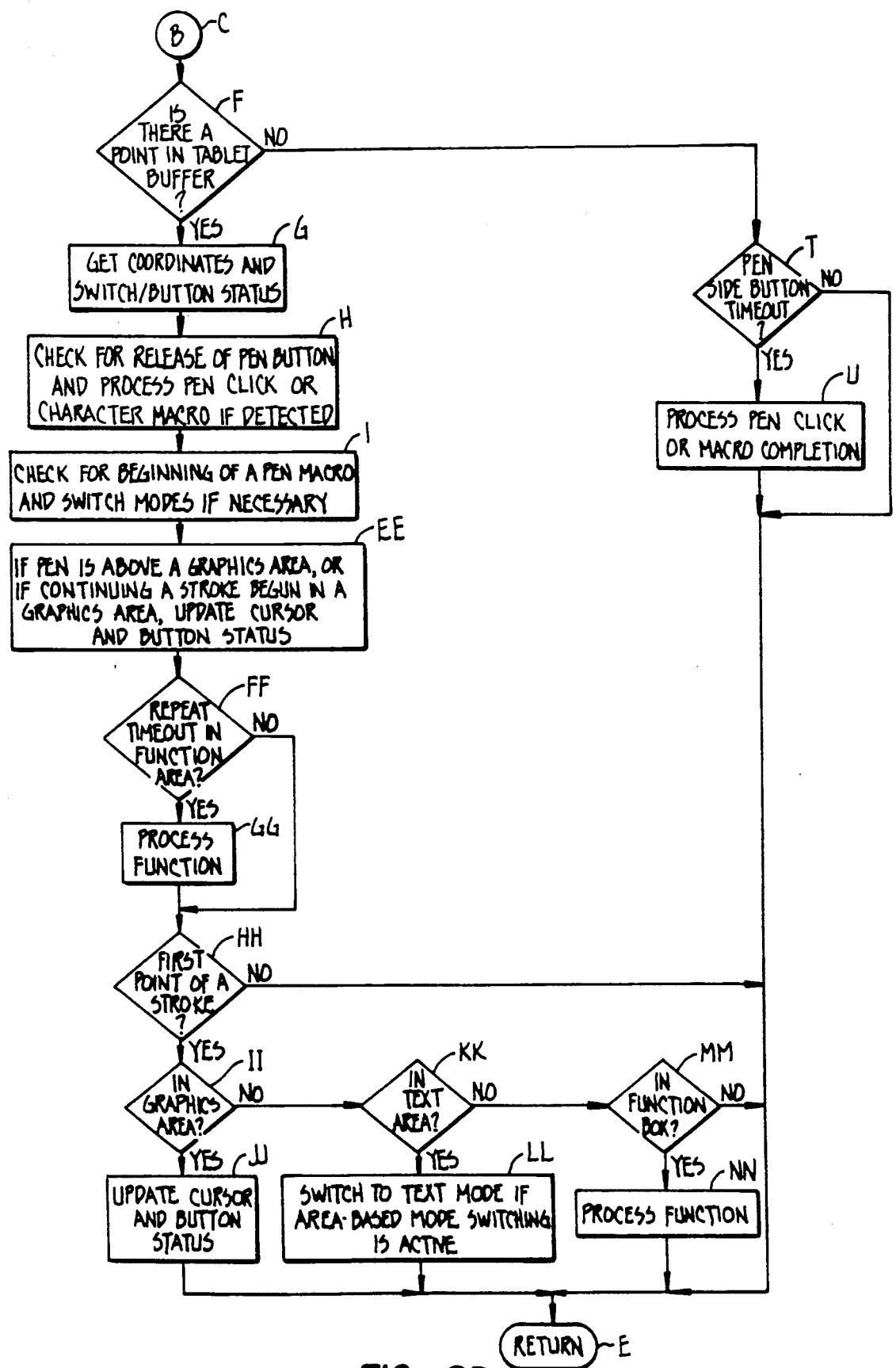
FIG._8D.

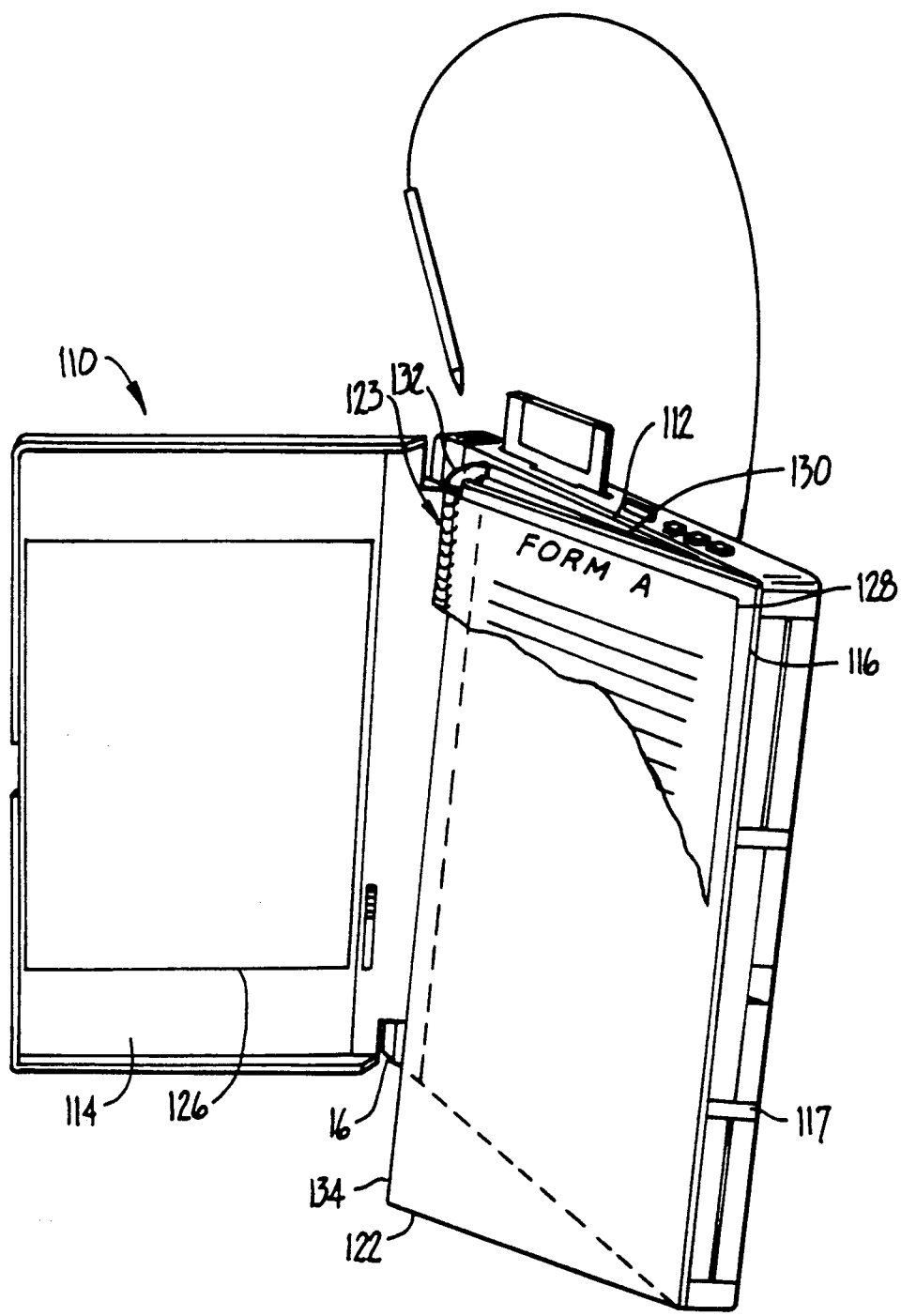
FIG._9.

KEYLESS FLAT PANEL PORTABLE COMPUTER—COMPUTER AIDED NOTEBOOK

BACKGROUND OF THE INVENTION

The present invention relates generally to portable computers and more specifically to a keyboardless computer, herein designated a computer aided notebook, that allows real-time coupling of manual paper form completion into machine recognizable form.

Patents related to the background technology owned by the assignee of the present invention include U.S. Pat. No. 4,561,105 issued Dec. 24, 1985, U.S. Pat. No. 4,718,102 issued Jan. 5, 1988, U.S. Pat. No. 4,573,196 issued Feb. 25, 1986, and U.S. Pat. No. 4,531,231 issued July 23, 1985, all of which relate to character recognition through stroke analysis with a digitizer. The background technology enables reliable and rapid recognition of handwritten characters using real-time stroke recognition techniques. While the background technology focused originally on the special problems related to recognition of Chinese character-based writing systems, the technology has been adapted to recognition of Roman and Arabic characters.

With the advent of computers, especially of portable computers, data processing and entry have been greatly facilitated. Even for those more proficient with a keyboard than a pen, many applications still require using pen and paper, such as inventory or form entry, and require subsequent data entry into a computer system for storage and processing.

Systems similar to pen and paper have been developed using so-called user friendly software programs that utilize icons and a mouse arrangement. Though these devices have decreased the needed time for the data processing and entry aspect of everyday business, still they are not as convenient and versatile as a pen. But until recently, a method to enter information and data directly by handwriting means in field applications had eluded the computer industry. Such a system now exists based on the use of a digitizer tablet.

A digitizer tablet allows the direct input of handwriting into a computer. Digitizer tablets have been used in the past primarily for entry of graphical information rather than symbols. Various digitizer tablets that have achieved various degrees of success have been on the market in recent years. However, many of these digitizer tablet systems are peripheral devices for a personal computer or computer work station. Only a limited number have had "portable" computer functionability.

These "portable" digitizer computers have all had varying success in using handwriting instead of a keyboard for input. One such device is the Casio IN-3000. This portable digitizer computer is relatively small, about the size of a book. It is limited to writing directly on the digitizer screen without the ability to place a form or template, and is most useful only in simple record keeping activities such as telephone numbers, appointments, and short memos. Furthermore, the symbol recognition ability is limited and cumbersome, often requiring repeated attempts before the desired symbol is acknowledged.

Another device found in the prior art is the Linus Write-Top. It has improved symbol recognition over that of the above apparatus, but it is limited in both display size and digitizer input area, and also has limited ability in using standardized forms or templates.

One last prior art device, known as Script-Writer, is a portable clipboard-housed computer. It allows use of standard forms and templates overlaying the digitizer, but only allows a limited display area for viewing the entered data and correcting such as errors occur. Moreover, none of these devices has a separate second digitizer. Nor does the prior art use a separate display that readily and easily shows most all of the entered data.

Most importantly, there is no keyboardless portable computer that allows the use of two separate digitizers in tandem that allows a user to input data on one digitizer, view it on a second digitizer that doubles as a display, and to make changes to the displayed material on the second digitizer as necessary.

Therefore, it is one objective of the present invention to provide a computer aided notebook that utilizes two or more separate digitizers combined in the form of a notebook. Another objective of the present invention is to provide a system that allows one digitizer to be rotated with respect to the second so that the computer aided notebook can be opened to a variety of selected positions and where one of such positions allows a user to hold the computer in one hand while data is entered with the other while the user is in a sitting, standing or walking position. Still another objective is to develop a system that processes any change of orientation of one digitizer with respect to the other, and correspondingly alters any coordinates entered or pixels to be output on the appropriate digitizer panel.

SUMMARY OF THE INVENTION

According to the invention, a keyboardless portable computer is provided which simulates a foldable notepad and which has a display which can be reoriented to the convenience of the user, carried in a self-protecting closed position and operated in any convenient open position. The computer comprises a first panel having a first flat surface, a second panel having a second flat surface, similar to the panels of a notebook in size and thickness. It further includes hinge means at a common margin for joining the first panel to the second panel such that the first flat surface is juxtaposed to the second flat surface in a closed position and is disposed side by side in a common plane in one of a selection of open positions. Significantly, the first flat surface comprises a first digitizer and the second flat surface comprises a second digitizer, and a stylus is provided which is connectable to at least one of the panels for interacting with at least one of the digitizers. One of the digitizers is integrated with a liquid crystal display through which visual output is provided. Thus, registration of a written symbol on the surface of the panel produces a displayed symbol, preferably at the position of registration. The panels may be detachable at the hinge means such that the panels may be operated independently or connected to other output displays, peripherals or input devices. In a specific embodiment, the panels may be folded back to back to one another for compact usage. The computer can be personalized to be enabled to operate only upon registration of a recognized signature on one of the digitizers.

In a still further embodiment, at least one of the digitizers may be hinged on one of the panels other than along the common margin, permitting the placement of a digitizer plate between pages of a paper notebook and allowing the spine of the notebook to be held in place along the common margin. In this manner, a bound notebook may be conveniently integrated with a computerized data capture system.

The invention will be better understood by reference to the following detailed description in connection with the accompanying drawings.

BRIEF DESCRIPTION OF THE DRAWINGS

FIG. 1 illustrates a portable computer according to the invention in a flat open position;

FIG. 2 is a perspective view of a portable computer according to the invention in a closed position;

FIG. 3 is a perspective view of a portable computer according to the invention in a compact open position folded back to back having a screen orientation upside down as compared to FIG. 1;

FIG. 4 is a perspective view of a portable computer according to the invention in a partially folded open position having a screen orientation oriented sideways as compared to FIG. 1;

FIG. 5 is a top plan view of a portable computer according to the invention in a position separated at the hinge;

FIG. 6A is an exploded illustration of a hinge in accordance with the invention;

FIG. 6B is an exploded illustration of the hinge showing the primary axis in accordance with the invention;

FIG. 6C is another exploded illustration of the hinge showing the primary axis in accordance with the invention;

FIG. 6D is an exploded illustration of the hinge showing the secondary axis in accordance with the invention;

FIG. 6E is an exploded illustration of the hinge showing the anchoring means in accordance with the invention;

FIG. 7A is a flow chart of a first subsystem of a computer in accordance with the invention;

FIG. 7B is a flow chart of a second subsystem of a computer in accordance with the invention;

FIG. 7C is a flow chart of a third subsystem of a computer in accordance with the invention;

FIG. 7D is a block diagram of a coordinate system used on the two digitizers in accordance with the invention; and FIG. 7E is a block diagram of a subsystem of a computer for the coordinate system as in FIG. 7D;

FIG. 8A is a flow chart of a tablet data processing portion of the computer operating system in accordance with the invention;

FIG. 8B is a flow chart of the tablet data processing as in FIG. 8A showing text mode;

FIG. 8C is a flow chart continuing the data processing in text mode as in FIG. 8B;

FIG. 8D is a flow chart of the tablet data processing as in FIG. 8A showing image mode; and FIG. 9 is a perspective view of a portable computer according to the invention in a partially folded open position having a screen orientation oriented sideways compared to FIG. 4, showing a second hinge.

DESCRIPTION OF THE SPECIFIC EMBODIMENTS

FIG. 1 shows a perspective view of a computer notebook 10 according to the present invention. Notebook 10 includes a first panel 12, a second panel 14 connected to first panel 12 by a hinge means 16 that allows both first panel 12 and second panel 14 to orient in a multitude of angles about hinge means 16, and a stylus 18 for writing on first panel 12 and second panel 14.

First panel 12 has a first flat surface 20 with an opaque first digitizer tablet 22 and allows placement of standard templates, pads of single-sheet hard copy forms or a thin pad of forms. A digitizer tablet includes a digitizer and the backing for mounting the digitizer; hereinafter, "digitizer" will be used instead of digitizer tablet. First panel 12 also has selected liquid-crystal displays for acknowledging data entered upon first digitizer 22. Second panel 14 includes a second flat surface 24 with a liquid crystal display and includes a transparent second digitizer 26 overlaying the liquid crystal display.

First panel 12 is primarily the data entry panel and houses the major electronics of the invention, namely the logic, memory, and power supply, as well as peripheral ports for a printer, modem, and other like peripheral devices. Second panel 14 serves primarily as a display panel and doubles as a secondary data entry panel. Each panel is connected to the other by means of hinge 16. Hinge 16 allows one panel to be set at any angle position relative to the other. In one specific embodiment, the panels will have at least four distinct settings including closed (FIG. 2), initial or partially opened (FIG. 4), flat (FIG. 1), and folded (FIG. 3) positions that will allow each panel to support a nominal amount of torque without movement. The configuration shown in FIG. 1 may also be rotated 180° in the plane of the figure, and the paper form the display correspondingly inverted with respect to the frame of the computer, for the convenience of left-handed users. Also included is means to allow electrical communication between the two panels, where the first panel 12 has the logic, memory, and power supply and second panel 14 provides a display and secondary data entry device. Two such means of communication are a ribbon computer cable and a wireless means, both are well known in the art.

Referring to FIG. 6A, hinge 16 includes a first hinge bracket 28, a second hinge bracket 30, a third hinge bracket 32 and a fourth hinge bracket 34 through which are threaded a primary axis 36 and a secondary axis 38 for holding first panel 12 and second panel 14 together. The primary axis 36 provides the axis about which first panel 12 revolves and secondary axis 38 provides the axis about which second panel 14 revolves. Each axis has a distinctly different locking mechanism with secondary axis 38 locking system permitting greater ease of movement than that of primary axis 36.

The locking mechanism of primary axis 36 includes a shaft 37 threaded at one end, and flared at the other. Primary axis 36 fits the flared end 39 of shaft 37 in first hinge bracket 28 (FIG. 6B) and its threaded end 41 through fourth hinge bracket 34 as fastening knob 42 mounts thereon (FIG. 6C). Fastening knob 42 turns to selectively fasten primary axis 36 and the increased tension tightens the fit of the flared end 39 on first hinge bracket 28 and first panel 12. In addition, a ceramic jacket 40 is used as a spacer at both ends 39 and 41 of primary axis 36 where in contact with first hinge bracket 28 and fourth hinge bracket 34 to provide improved friction to allow the first panel 12 to support a nominal amount of torque without movement and to reduce wear on the plastic parts.

The locking mechanism of second panel 14 includes a threaded shaft secondary axis 38 which interacts with second hinge bracket 30 and third hinge bracket 32 and is secured by another fastening knob 42 (FIG. 6D).

Third hinge bracket 32 is also threaded so that as fastening knob 42 is turned clockwise, the tension between second hinge bracket 30 and third hinge bracket 32 exerted on second panel 14 can hold second panel 14 as rigidly as desired. Each hinge bracket 30 and 32 uses a semi-hard rubber washer 46 to increase the friction needed to hold the panels 12 and 14.

First panel 12 and second panel 14 can be separated by releasing anchor blocks 48 on first panel 12 (FIG. 6E). Each anchor block 48 is fastened by a fastening latch 50 which extends from the first panel 12. Fastening latch 50 is secured with a screw and can be easily loosened with a screw driver. Each anchor block 48 has pins 51 which extend into pin receiving indentations 52 of the first panel 12 and assist in minimizing the undesired shifting or rotation of anchor block 48. This allows the removal of second panel 14 without any loose parts as would result by undoing either the primary axis 36 or the secondary axis 38 mechanism.

Stylus 18 attaches to either first panel 12 or second panel 14 by cable 44. Cable 44 also provides electrical communication between stylus 18 and keyboardless computer notebook 10 should stylus 18 and digitizers 22 and 26 use electromagnetic means for symbol input and recognition. In one specific embodiment stylus 18 includes a tip switch 54 that records whether the stylus is up or down in relation to one of the digitizer panels. Stylus 18 also includes a side switch or button 56 and is also capable of communicating information to computer 10. Stylus tip switch 54 and stylus side button 56 are discussed in more detail below.

This embodiment of the hinge 16 provides for first panel 12 and second panel 14 to be oriented in any position within a 360° arc about hinge 16. Ideally, four main positions will be preset to allow functionability. These four positions are: closed, initial or partially opened, flat and folded. The closed position is shown in FIG. 2 and occurs when the first panel 12 and the second panel 14 are juxtaposed face to face providing protection to the panel surfaces when the apparatus is not in use. The initial position is illustrated in FIG. 4 and has one panel approximately perpendicular to the other, much like a conventional laptop portable computer. The flat position has both panels lying in the same plane side by side. In a folded position shown in FIG. 3 the first panel 12 and second panel 14 are juxtaposed back to back in order to facilitate carrying the apparatus in one hand and entering data with the other.

In order to facilitate use of the keyless computer 110 with a bound paper notebook 123, such as a spiral bound notebook, a second hinge 116 (FIG. 9) may be provided between the first panel 112 and the first digitizer 122. The first digitizer 122 is preferably a rigid, thin sheet electrically and mechanically coupled to the first panel 112 through the second hinge 116. The second hinge 116 is preferably on the margin 117 of the first panel 112 opposite the first hinge 16 on the common margin of the first panel 112 and the second panel 114. However, it can be along any other panel margin. Space is provided under the first digitizer 122 to accommodate the pages 130 of the bound paper notebook 123 having its spine 132 along an unhinged or free margin 134 of the first digitizer 122. One or more pages 128 of the bound notebook 123 may overlay the first digitizer 122, allowing a user to register symbol on the paper page 128 which are also received through the first digitizer 122, while the balance of the notebook 123 is behind the first digitizer 122 against the first panel 112.

In an alternative embodiment (FIG. 1) a spiral notebook may be coupled directly to the computer through a second hinge 116 formed by eye clips either along the spine of the hinge 16 or along the opposing margin 17. Hinge pins and eyes may be provided along any margin to accommodate various configuration of spiral notebooks.

Since the present invention incorporates two digitizers that must function in tandem, means must be provided that allows for display and input orientation between first panel 12 and second panel 14 as necessary upon rotation about hinge 16. Therefore, the first Step A (FIG. 7A) requires the user to indicate a change of orientation of one panel 12 or 14 of keyboardless computer notebook 10. Step B follows as the system software allows for such orientation and responds to the user's indication by determining what the new orientation is while Step C stores the value of the rotation in system memory. Routine processing then continues as usual (Step D).

After the system has processed a change of orientation, the digitizer coordinates must likewise be processed. The next flow chart thereafter (FIG. 7B), shows that when a coordinate pair is received (Step E) from any portion of the digitizer, the system software retrieves (Step F) the rotation value from system memory, checks whether a rotation is needed (Step G), and if so, performs the corresponding coordinate transformation (Step H) on the coordinate pair. Processing of the coordinate pair then continues as usual (Step I).

The final flow chart (FIG. 7C) shows that when a pixel, in the form of a coordinate pair, is ready for output to the display (Step J), the system software retrieves the rotation value from system memory (Step K), checks whether a rotation is needed (Step L), and if so, performs the corresponding coordinate transformation (Step M) on the pixel coordinates. Display output of the pixel then continues as usual (Step N).

In a specific embodiment, the user indicates the change of orientation by writing an upward-pointing arrow or some other symbol that is distinctly recognizable in each orientation. If keyboardless computer notebook 10 is not presently configured for that orientation, it will recognize the arrow pointing in a different direction. From this it determines what is the new orientation and stores the corresponding rotation, as stated above.

The two digitizers are conceptually a single digitizer, with a single stylus and a single coordinate system, but physically divided into two or more parts, which may be variously shaped, and which may be spatially separated. The range of coordinates reported by each portion of the digitizer does not overlap with the range of coordinates reported by any other portion. When the digitizer reports a coordinate point, the system software determines which portion of the digitizer the point belongs to by the range of coordinates in which the point lies. Different portions of the digitizer may be assigned different functions, and the action taken by the system software is determined by the portion to which the received point belongs.

In a particular embodiment, the digitizer consists of two rectangular parts, having one side of the same length. In one configuration, a first and second portion 26 and 22 are attached with the sides of equal length aligned, as shown in FIG. 7D (compare FIG. 1). The coordinates 58 and 60 along the aligned sides are identical ($x_0$ to $x_a$ in FIG. 7D), while the coordinates 62, 64, 66 and 68 in the other direction increase sequentially across the boundary 70 between the two portions ($y_0$ to $y_b$ and $y_b+1$ to $y_c$ in FIG. 7D). The second portion 22 with lower values of y is opaque, while the first portion 26 with higher values of y is coincident with the display. The two digitizer portions and 26 are assigned different functions, with the precise function of each determined by the application software in use. For example:

1. The opaque digitizer 22 is used for control commands and data input, while the display digitizer 26 is used for editing the data already entered, using gestures.
2. The opaque digitizer 22 is used to fill out a form (such as an insurance policy application), while the display digitizer 26 displays information from a database (such as actuarial data or pricing information for the policy) that corresponds to the information entered in the form. The user filling out the form on the opaque digitizer 22 can move the stylus 18 to the display digitizer 26 to various aspects of the database query operation.

FIG. 7E includes a flow chart for handling the input from such a two-part digitizer.

The opaque digitizer 22 can also be detached (FIG. 5), and the notebook computer used with the display digitizer 26 only, for appropriate applications.

Another aspect of the system program is to allow the computer to be personalized so as to operate only upon registration of a recognized signature on one of the digitizers. One such system is found in a product of the assignee of this invention and is called Signature Verification.

In a specific embodiment, an operating system proceeds upon initial power to an initial SELF-TEST diagnostic check to verify that the CPU and other logic circuits are functioning normally. Diagnostic test programs of this type are well know to one of ordinary skill in the art.

Next, parameters entered in selected ROM locations are used to initialize the various communication ports and I/O buffers. The system then proceeds to initialize the RAM variables and default overlay before the system can begin functional operation.

FIG. 8A is a flow chart showing a portion of the notebook computer operating system relating to a tablet data processing routine. The tablet data processing routine allows symbol entry and communication on the first or second panel, determines whether the entry is in a text, a function, or a graphics area, and processes the entered information for display upon either the first or the second panel. The system can be in one of any three modes: text, function, or graphics mode. Each type of mode is used for entry of a different type of data with the stylus. Text areas are used for entering handwritten characters for recognition and text entry; graphics areas are used for entering graphical data; and function areas are used for executing various functions corresponding to the different function boxes within the area. Examples of such function commands are given below. A user might want to enter one or more characters of ordinary text so that when the function is processed, the result is the same as if the user had entered these characters, in order, as text. Also some characters cannot conveniently be entered by writing text with a stylus. Examples include the escape, backspace and cursor control characters, and combinations of ordinary characters with the Alt or Control features. And finally, some special functions are provided for operation of the computer. Examples include switching among numeric, alphabetic, and alphanumeric recognition modes; selection of upper and lower case text; and alignment of an overlay placed on the opaque digitizer by touching pre-defined alignment points.

Therefore, the process begins with Step A by determining whether the system is in text recognition mode. If yes, the system follows path A (Step B), if not, then the system follows path B (Step C). Once path A or B has finished the system determines whether to continue processing the tablet data (Step D). If so, it returns and asks whether the system is in recognition mode again to complete the cycle; otherwise, it returns (Step E).

FIG. 8B shows the processing system proceeding to alternate loop A where Step F first determines whether there is a point in a tablet buffer. The tablet sends bytes of data that encode coordinate information to the computer by means of hardware interrupts. An interrupt service routine, which is part of the system software, processes these interrupts and stores the coordinates in a portion of system RAM set aside for use as a tablet buffer. The tablet data processing routine checks this buffer, removes coordinates from it as needed, and then processes them. Such interrupt service routines and buffers are well known in the art.

If a point is found, Step G obtains the coordinates of the point and the status of the stylus tip switch and the stylus side button. The information on the status of these switches is transmitted and stored within the coordinate information in the tablet buffer. As the stylus moves through a sequence of characters, the operating system has the capability of interpreting certain of these sequences of characters as macros, or more specifically, character macro or stylus macro. When one of these macros is entered, the computer processes a corresponding command known as the macro definition. To distinguish a character macro from the entry of ordinary text, the user depresses the stylus side button and holds it down while writing the macro. When the user releases the side button, the macro is complete and the computer processes the macro definition. The side button may also be pressed and released without writing. This operation, known as a stylus click, is equivalent to pressing the Return or Enter key on a keyboard-based computer.

Step H determines whether the stylus button has been released so that it can process the click or the character macro completion if detected. The system then checks (Step I) for the beginning of the stylus macro and switches modes if necessary. Next, Step J switches to image mode if the point is in a graphics area and area-based mode switching is active. The area-based mode switching is a feature for automatically switching into text mode when the stylus is in a text area and into graphics mode when the stylus is in a graphics area. When this feature is not active, function boxes are ordinarily provided whereby the user manually selects either text mode or graphics mode.

Step K determines whether the stylus is down. If yes, Step L determines if this is the first point of a stroke. Should this be a first point of a stroke, Step M determines if it is in a function box. If yes, Step N recognizes the character in the stroke buffer, if any, places it in a queue, and processes the function before storing the point in the stroke buffer (Step O) even if it is not found in a function box. Coordinate data from the tablet are stored in the form of strokes, a stroke being a sequence of points all having the stylus tip switch closed (stylus-down points). The strokes are separated by one or more stylus-up points. The strokes are stored in a portion of system RAM set aside for use as a stroke buffer. When a function box is touched or the segmentation criteria (see below) indicate that a character has been completed, the strokes in the stroke buffer that correspond to that character are processed by the recognition algorithm, the character is placed in a queue, and the strokes are removed from the buffer. A queue is any buffer (portion of system RAM) into which items are inserted in order and retrieved in the same order. Here, it is a buffer containing text characters that have been recognized and are ready for whatever application program is currently running on the computer. Characters from this queue are retrieved and processed by the application in a manner analogous to that employed by a keyboard-based computer. Such operations are well known to one of ordinary skill in the art.

Should the point not be the first point of a stroke, (Step L), Step P checks for repeat timeout in a function area and processes the function (Step Q) if it has occurred. When a user puts the stylus down in a function area and keeps it there for some period of time, the computer will repeat the operation corresponding to the function box at a predetermined rate. This is analogous to the operation of many keyboard-based systems, in which the character corresponding to a particular key is repeated while the key is held down. In the keyboardless computer, the software records the system time whenever a function box is processed. Thereafter, at various points indicated in the diagram and the description, it checks to determine whether the stylus is still down in the function area and whether the predetermined time corresponding to the repetition rate has elapsed. If so, it repeats the function and updates the corresponding system time.

After processing the function (Step Q), or not finding a repeat timeout in the function area (Step P), Step O stores the point in the stroke buffer. If the stylus is not down (Step K), Step R determines if the stylus was down for the previous point. If so, a stroke has been completed, and Step S increments the stroke count (this is a word in system RAM whose value is set to the number of strokes in the stroke buffer).

Should there be no point in the tablet (Step F), Step T checks for a stylus side button timeout and processes a stylus click or a macro completion if detected (Step U), before proceeding to point C (Step V). In the described embodiment, the stylus side button is used for two purposes: (1) A "stylus side button click" is produced by pressing and releasing the side button without touching the stylus tip down. This operation has the same effect as pressing the Enter key on a keyboard-based computer. (2) A character macro is produced by holding the side button down while writing one or more characters. In either (1) or (2), it may happen that the user removes the stylus from the proximity region of the tablet (the region for which the tablet reports the stylus position even if the stylus tip switch is not closed) before releasing the side button. In that case, the tablet may fail to report the release of the stylus side button. To deal with this case, the operating system records the system time at which the most recent tablet report was received with the button down. Thereafter, at various points indicated in the diagram and the description, it checks to determine whether a pre-defined length of time has elapsed since the last such point was received. If so, it assumes that the stylus is outside proximity and completes the processing of the pending side button click or character macro, as if the side button had been released. A character macro consists of one or more characters written with the stylus side button down. Macro completion occurs either when the side button is released or the stylus side button timeout expires. In either case, the system processes macro completion by executing the command corresponding to the macro that was written. Typically this command consists of a sequence of characters, which are queued for the application running on the computer, as if the user had entered them as text.

Once the point is stored in the stroke buffer (Step O), or the stroke counter is incremented (Step S), or the stylus was not down for the previous point (Step R), or there was not a point in the tablet buffer and the stylus side button timeout has been checked and processed if necessary (Step U), the system follows path C. Step W then determines whether the stroke has been completed (FIG. 8C). If yes, Step X applies standard smoothing algorithms to the stroke data. Step Y then determines if the stylus is in a text area while Step Z determines if the stylus is in a function area. If the stroke is in a text area (Step Y), Step AA checks for gridless or gridded segmentation criteria, then recognizes and reports the character if it is complete. During text entry, the system software must determine when one written character ends and the next one begins. This is called character segmentation. One means of doing this is called gridded segmentation. In this method, the user writes characters in a grid of boxes printed on the tablet overlay on the opaque digitizer or displayed on the combined digitizer/display. The user writes one character per box. When the user begins writing in a new box, the character written in the previous box is known to be complete, and the system software performs recognition on it. Use of the gridless method of character segmentation eliminates the need for a grid of writing boxes. Instead, the system software determines when the end of a character occurs by means of a set of rules involving the shape and location of the strokes, and particularly involving the horizontal distance between strokes. Both the gridded segmentation criteria and the gridless segmentation criteria make use of the fact that the user continues writing the next character after completing the current one. An additional criterion is needed to take care of the case of the last character written. Recognition timeout occurs if a predetermined length of time has passed since the last stylus-down point was received. If this is the case, the character is considered complete and is recognized and queued.

If the stroke is in a function area (Step Z), Step BB recognizes the character entered in the stroke buffer, if any, and queues it, then processes the function. After either Step AA or Step BB, or if the stroke has not been completed (Step W), Step CC then determines whether a recognition timeout has occurred, and if so Step DD recognizes the character in the stroke buffer, if any, and queues it before returning (Step E).

If the loop is not in recognition mode (Step A), Step C follows alternate loop B. Step F determines if there is a point in the tablet buffer as illustrated in the flow charts in FIG. 8D. If there is a point, Step G recovers the coordinates and switch/button status. Step H then checks for the release of the stylus button and processes the stylus click or character macro if button release is detected. Step I next checks for the beginning of a stylus macro and switches modes if necessary. In Step EE, if the stylus is above a graphics area, or is continuing a stroke begun in a graphics area, the cursor and button status are updated. Step FF then checks for a repeat timeout in the function area; if yes, Step GG processes the function before determining whether the stylus has begun the first point of a stroke (Step HH). If the first point is begun in a graphics area (Step II), the cursor and button status are updated. If the first point is in a text area (Step KK), Step LL switches to text mode if area-based mode switching is active. If the first point is in a function box (Step MM), Step NN processes the function.

If there is no point in the tablet buffer (Step F), Step T checks for a side button timeout, then Step U processes the stylus click or macro if Step T detected a timeout. Should Step T be negative, Step HH be negative, Steps II, KK and MM be negative, or Steps JJ, LL and NN be completed, Step E proceeds to return. Thus completes the tablet data processing routine.

The invention has now been explained with reference to specific embodiments. Other embodiments will be apparent to those of ordinary skill in the art. It is therefore not intended that the invention be limited except as indicated by the appended claims.

We claim:

1. A portable computer comprising:
   a first panel having a first flat surface;
   a second panel having a second flat surface;
   hinge means for joining said first panel to said second panel such that said first flat surface is juxtaposed to said second flat surface in a closed position and is disposed side by side in a common plane in one of a selection of open positions;
   said first flat surface comprising a first digitizer;
   said second flat surface comprising a second digitizer and a display juxtaposed together to form a digitizer-display unit; and
   a stylus connectable to at least one of said first panel and said second panel for interacting with at least one of said first digitizer and said second digitizer, wherein data entered on one of said digitizers and displayed on said digitizer-display unit is freely alterable on said digitizer-display unit.

2. The portable computer according to claim 1 wherein said first digitizer is opaque.

3. The portable computer according to claim 2 wherein said second digitizer is transparent and said display is a liquid crystal display, said second digitizer overlaying said liquid crystal display.

4. The portable computer according to claim 2 wherein said display is a liquid crystal display, said liquid crystal display overlaying said second digitizer, said liquid crystal display being sufficiently pliant to permit registration of ciphers on said second digitizer by said stylus.

5. The portable computer according to claim 1 wherein said first panel includes a flat panel display, said flat panel display having a user-selectable display format orientation to accommodate right-handed, left-handed and dual-handed usage.

6. The portable computer according to claim 1 wherein said second digitizer is transparent and said display is a liquid crystal display, said second digitizer overlaying said liquid crystal display.

7. The portable computer according to claim 1 wherein said display is a liquid crystal display, said liquid crystal display overlaying said second digitizer, said liquid crystal display being sufficiently pliant to permit registration of ciphers on said second digitizer by said stylus.

8. The portable computer according to claim 1 wherein said second panel is detachable from said first panel, said second panel being functional as a manual input device and a visual output device independent of connection to said first panel.

9. The portable computer according to claim 1 wherein said second panel is detachable from said first panel, said second panel being functional as a manual input device and a visual output device in a wireless connection to said first panel.

10. The portable computer according to claim 9 wherein said hinge means has sufficient travel to permit said first panel to open to the back of said second panel in one of a selection of open positions.

11. The portable computer according to claim 1 further including means for recognizing a signature of an authorized user for enabling access to programs and data stored in said computer.

12. The portable computer according to claim 1 wherein said hinge means has sufficient travel to permit said first panel to open to the back of said second panel in one of a selection of open positions.

13. The portable computer according to claim 1 wherein additional attachment means are provided along a margin of a panel for attaching a spiral bound notebook.

14. The portable computer according to claim 1 further including second hinge means disposed on a margin other than a margin common to said first panel and said second panel, said second hinge means joining said first digitizer to said first panel allowing for interleaving of said first digitizer with a bound paper notebook.

15. A personal computer as in claim 1 and includes:
   means for providing a change of orientation between said first and second panels; and
   means for processing a set of digitizer coordinates in relation to said change of orientation.

16. A portable computer comprising:
   a first panel having a first flat surface;
   a second panel having a second flat surface;
   hinge means for joining said first panel to said second panel such that said first flat surface is juxtaposed to said second flat surface in a closed position and is disposed side by side in a common plane in one of a selection of open positions;
   said first flat surface comprising a first digitizer;
   said second flat surface comprising a second digitizer;
   a stylus connectable to at least one of said first panel and said second panel for interacting with at least one of said first digitizer and said second digitizer;
   a primary axis;
   a secondary axis;
   a plurality of hinge brackets;
   a first securing means wherein said primary axis inserts through said first panel and a first, second, third and fourth of said hinge brackets so that said first panel pivots about said primary axis, or held stationary as said securing means secures said primary axis and said first panel; and
   a second securing means wherein said secondary axis inserts through said second panel and a first, second, third and fourth of said hinge brackets so that said second panel pivots about said secondary axis, independent of said first panel, or is held stationary as said second securing means secures said secondary axis and said second panel.

17. A method for operation of a personal computer that includes at least a first and a second digitizer, in a variable rotational orientation one to the other for coordinating changes in said orientation and wherein said second digitizer includes a display so that data inputted to said personal computer is displayed and is freely alterable on said second digitizer, said method comprises the steps of:

storing an initial set of rotation values;
   indicating said change in said orientation to said computer;
   comparing said stored rotation values to said change to determine if different; and if different
   recognizing and storing of a new set of rotation values corresponding to said change in said orientation.

18. A method as in claim 17 including a digitizer coordinate process further comprising the steps of:

entering a coordinate pair on one of said digitizers;
   retrieving said stored rotation values and determining a need for a rotation to said coordinate pairs;
   performing corresponding coordinate transformation; and
   continuing said coordinate process.

19. A method as in claim 17 or 18 including a pixel output display process for displaying a pixel, said method further comprises the steps of:

storing said pixel in the form of a coordinate pair;
   retrieving said coordinate pair;
   retrieving said rotation values;
   performing a coordinate transformation to said coordinate pair; and
   displaying said pixel based on said transformed coordinate pair.

* * * * *